United States Patent [19]

Bordin

[11] Patent Number: 5,018,439
[45] Date of Patent: May 28, 1991

[54] ROLLING MACHINE PARTICULARLY FOR PRODUCING CROISSANTS

[75] Inventor: Italo Bordin, Cadoneghe, Italy

[73] Assignee: C.I.M. S.r.l., Mestrino, Italy

[21] Appl. No.: 300,864

[22] Filed: Jan. 24, 1989

[30] Foreign Application Priority Data

Feb. 10, 1988 [IT] Italy .................. 41526 A/88

[51] Int. Cl.⁵ .................................. A21C 3/06
[52] U.S. Cl. .................. 99/450.2; 99/450.6; 99/450.7; 425/321; 425/335
[58] Field of Search ............ 199/353, 450.1, 450.2, 199/450.6, 450.7, 450.8, 516, 483, 352, 355, 356; 425/321, 371–373, 367; 100/151, 153; 198/815, 627; 426/502, 500, 503, 518

[56] References Cited

U.S. PATENT DOCUMENTS

| | | | |
|---|---|---|---|
| 2,450,033 | 9/1948 | Cohen | 99/450.1 |
| 3,354,843 | 11/1967 | Velazquez | 425/321 |
| 3,704,664 | 12/1972 | Fisher, Jr. | 99/450.2 |
| 3,861,291 | 1/1975 | Cuzaski | 99/450.2 |
| 4,043,259 | 8/1977 | Sato | 99/353 |
| 4,089,407 | 5/1978 | Bullivant | 198/815 |
| 4,171,197 | 10/1979 | Sato | 99/353 |
| 4,435,144 | 3/1984 | Kemper | 425/371 |
| 4,741,263 | 5/1988 | Ueno et al. | 99/450.2 |
| 4,767,638 | 8/1988 | Uhrovic | 426/500 |
| 4,828,862 | 5/1989 | Svengren et al. | 425/321 |

*Primary Examiner*—Timothy F. Simone
*Attorney, Agent, or Firm*—Guido Modiano; Albert Josif

[57] ABSTRACT

The machine comprises a large-diameter rotating cylinder which co-operates upstream with a conveyor belt which feeds triangles of dough thereto and co-operates downstream with a lower rolling and unloading belt and with an upper rolling belt, forming a seat with sliding walls in which said triangles are rolled.

The lower rolling belt is stretched between a motorized roller and a return blade the axis whereof is parallel and adjacent to the axis of the above mentioned rotating cylinder. The blade is associated on an eccentric axis with means adapted to oscillate it between preset angular positions. Means adapted to recover the tension of the belt during the oscillations and means adapted to synchronize said oscillations with all the other movements of the machine are furthermore provided.

22 Claims, 2 Drawing Sheets

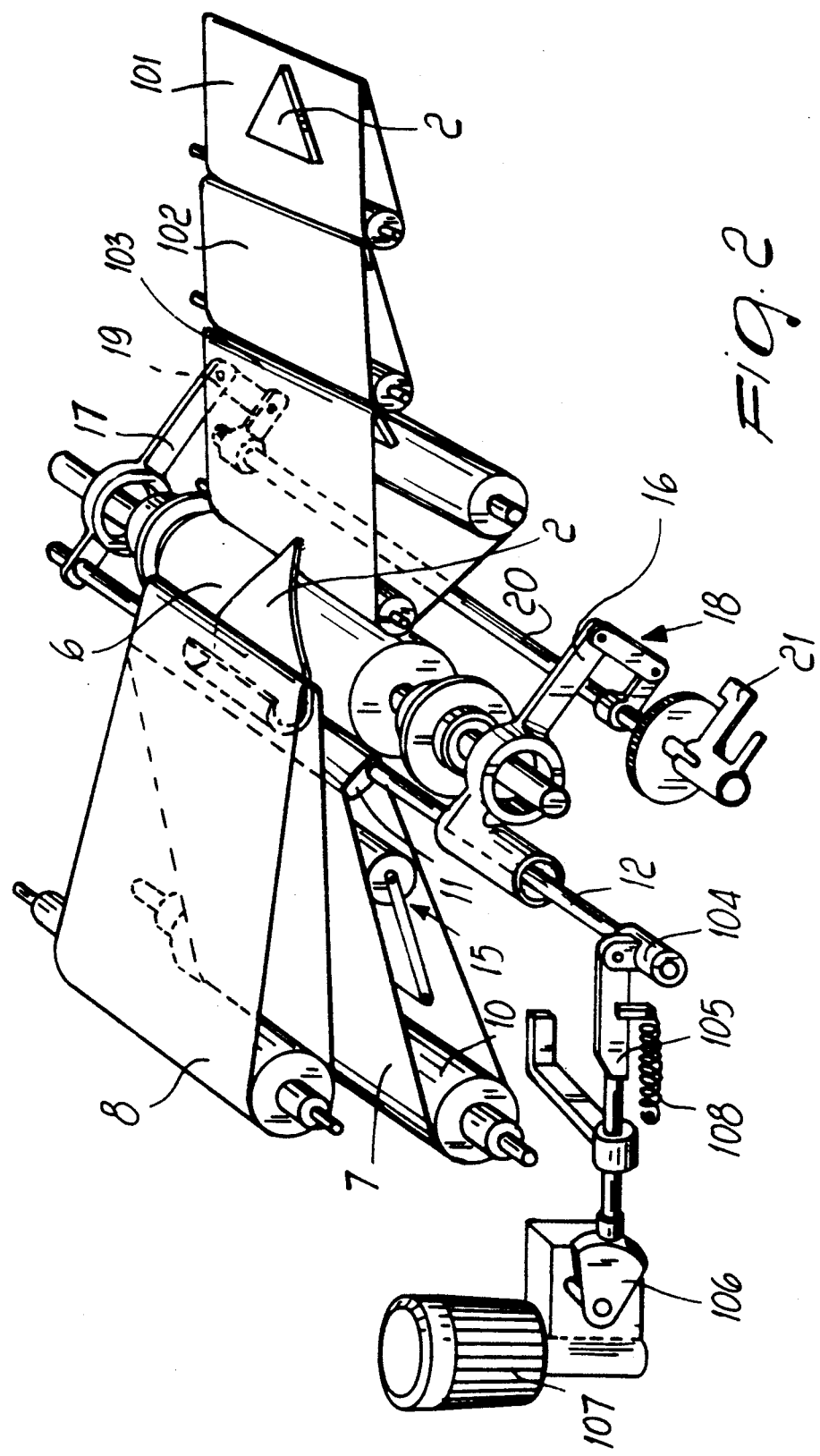

ROLLING MACHINE PARTICULARLY FOR PRODUCING CROISSANTS

BACKGROUND OF THE INVENTION

The present invention relates to a rolling machine particularly for producing croissants.

It is known that croissants are obtained by rolling a triangle of dough, possibly filled with jam, meat paste, almond paste, chocolate etc. which is subsequently cooked.

The triangles of dough are currently rolled by using rolling machines essentially constituted by a large-diameter rotating cylinder, possibly coupled with a calibration roller, which is fed upstream with triangles of dough and co-operates downstream with a lower rolling belt and with an upper rolling belt, forming a seat in which the croissant is formed.

The lower rolling belt is stretched between a motorized roller and a return rod the axis whereof is parallel and adjacent to that of said rotating cylinder; said return rod has, on the side towards said cylinder, an inclined longitudinal planar portion adapted to facilitate the folding of the edge of the incoming trle of dough and therefore its subsequent rolling.

During the forming step the croissant naturally increases in volume, and after moving over and beyond the planar region it is moved by the belt and removed from the machine.

Such a machine, however, is exclusively suitable for producing croissants with no filling, as syringes or other similar devices must be used for filling the croissants.

SUMMARY OF THE INVENTION

The aim of the present invention is to eliminate the above described disadvantage, in particular by providing a rolling machine particularly for producing normal and filled croissants.

An object of the invention is to provide a particularly sturdy, safe and versatile machine capable of a high hourly production rate.

Not least object is to provide a rolling machine which can be produced at low cost with conventional production systems.

This aim, as well as these and other objects which will become apparent hereinafter, are achieved by a rolling machine particularly for producing croissants, comprising a large-diameter rotating cylinder which is fed upstream with triangles of dough by a conveyor belt and co-operates downstream with a lower rolling and unloading belt and with an upper rolling belt, forming a seat with sliding walls in which said triangles are rolled, characterized in that said lower rolling belt is stretched between a motorized roller and a return blade the axis whereof is parallel and adjacent to the axis of said rotating cylinder, said blade being associated with means adapted to oscillate it between preset angular positions, means adapted to recover the tension of the belt during said oscillations being provided, means adapted to synchronize said oscillations with all the movements of the machine being furthermore provided.

BRIEF DESCRIPTION OF THE DRAWINGS

Further characteristics and advantages will become apparent from the detailed description of two embodiments illustrated only by way of non-limitative example in the accompanying drawings, wherein:

FIG. 2 is a schematic view of the machine, according to a second aspect of the invention.

DESCRIPTION OF THE PREFERRED EMBODIMENTS

Figure 1:
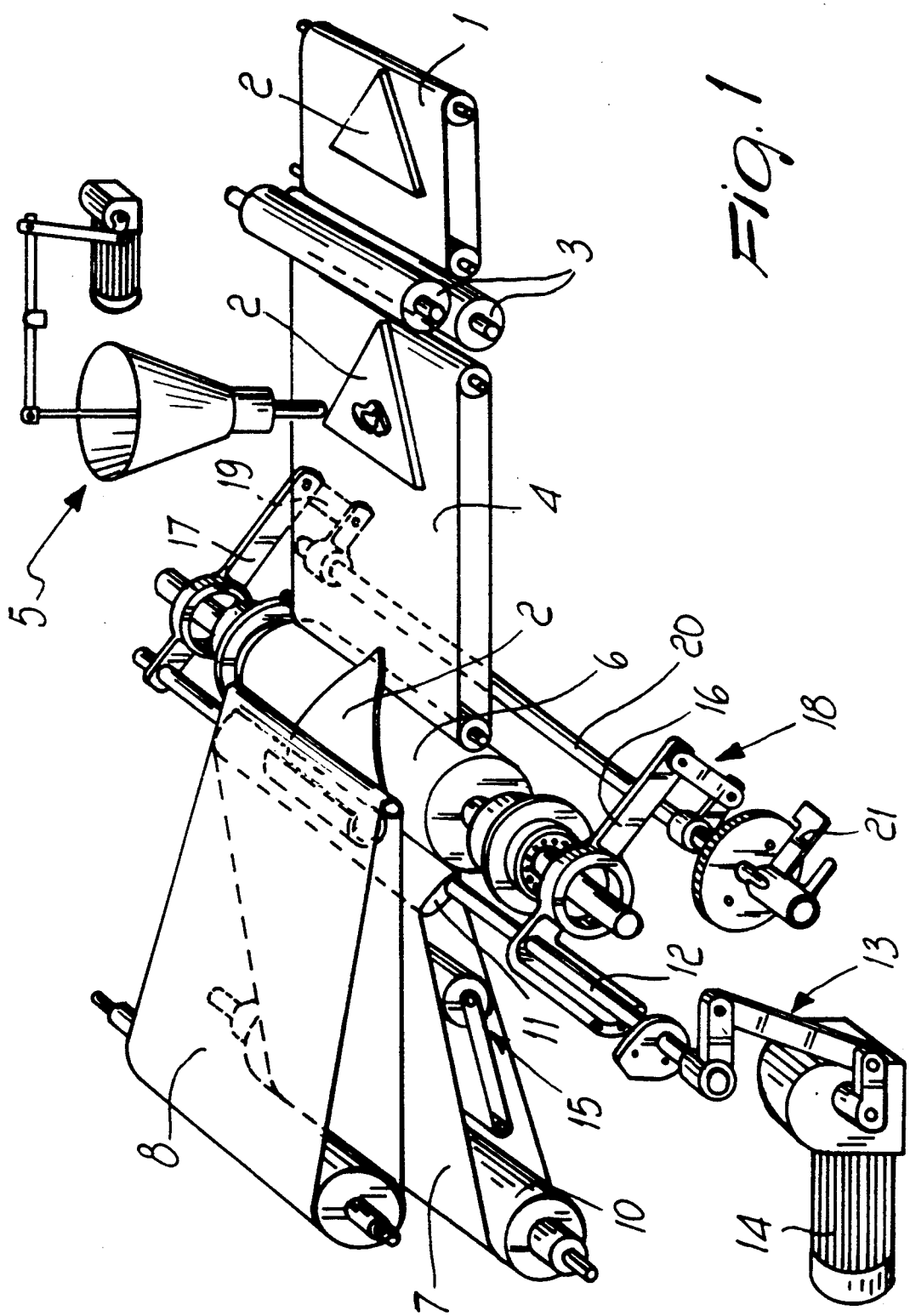
FIG. 1 is a schematic view of the machine, according to a first aspect of the invention.

With reference to FIG. 1, the rolling machine according to the invention comprises a first conveyor belt 1 for transporting triangles of dough 2, ahead of which there is a pair of calibration rollers 3 followed by a second conveyor belt 4 above which a dosage device, generally indicated by 5, is arranged.

A large-diameter cylinder 6 is arranged after said second conveyor belt 4 followed by a first endless belt means constituted by a lower rolling and unloading belt 7 and a second endless belt means constituted by an upper rolling belt 8.

In particular, said belts 7 and 8 and the cylinder 6 form a seat in which the triangles of dough 2 are rolled and the croissants are formed.

According to the invention, the belt 7 is stretched between a motorized roller 10 and a return blade 11, rigidly associated with a rod or rod-like member 12, the axis whereof is parallel and adjacent to the axis of said cylinder 6.

The blade 11 is welded to the rod 12 so as to extend in a plane extending parallel to the axis of the cylinder 6.

Said rod 12 is associated with the end of a lever system in the shape of an articulated quadrilateral 13 coupled to an electric motor 14, the rotation whereof oscillates the blade 11 between a highly upwardly inclined position and a less inclined position.

In order to recover the tension of the belt 7 during said oscillation of the blade 11, a rocker arm mounted weight-controlled idler 15 is provided, as clearly illustrated in FIG. 1.

Said rod 12 is rotoidally associated at its ends with connecting rod means constituted by two connecting rods, respectively 16 and 17, pivoted on the axis of said cylinder 6 and concurrent, by means of lever systems 18 and 19, on a same shaft 20; said shaft, rotated by means of an adjustment handle 21, correspondingly rotates said cylindrical rod 12 about the axis of said cylinder 6.

The operation of the machine is, in this case, controlled and actuated by electric and electronic devices and is as follows: a triangle of dough 2 is fed through the pair of calibration rollers 3 which laminate it to the required thickness, and is then fed by said rollers onto the conveyor belt 4, which stops at the device 5 to allow the dosage operation.

At the end of said operation, the second conveyor belt 4 restarts and the triangle of dough 2 is fed onto the cylinder 6 and into the seat formed with the rolling belts 7 and 8.

When the croissant is formed, the electric motor 14 turns the blade 11 down so that said croissant can be sent towards the output of the machine by the rolling belt 7.

Since the rod 12 can rotate about the axis of the cylinder 6, it is possible to vary the dimensions of the seat in which the croissants are formed.

With reference now to FIG. 2, the rolling machine according to a second aspect of the invention comprises, ahead of said cylinder 6, a system composed of three spacer belts, respectively 101, 102 and 103, each motorized at a higher speed than the preceding one so as to space the triangles of dough arriving from a feeder device.

In this second embodiment the cylindrical rod 12 is associated at one end with an oscillating lever 104 with which an arm 105 is associated; said arm is reciprocatingly slidable by virtue of the actuation of a rotating cam 106 associated with a motor 107 and is kept in contact with said cam by means of a traction spring 108.

The oscillation of the lever 104 correspondingly moves the return blade 11 as previously mentioned for the first embodiment.

The operation of the machine, according to this second aspect of the invention is similar to the preceding one as regards the forming of the croissant inside the seat formed between the cylinder 6 and the rolling belts 7 and 8; a remote switch rotates the motor 107 through one complete revolution, thus oscillating the blade 11 and allowing the transport and unloading of said croissant.

From what has been described above, the aim of the present invention is thus clearly achieved, a machine having been provided which is capable of producing both normal and filled croissants, solving the problems related to the greater volume occupied by the latter after rolling.

The invention thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

I claim:

1. A rolling machine particularly for producing croissants comprising:
    transport means for moving dough material and defining a transport plane,
    first endless belt means defining an unloading plane,
    at least one cylinder interposed between said transport means and said endless belt means and having a cylinder axis,
    second endless belt means overlying said first endless belt means and partially overlying said cylinder,
    at least one seat defined by said first endless belt means, said second endless belt means and said cylinder, said transport means being adapted for moving dough material onto said cylinder, said seat being adapted for rolling dough delivered to said cylinder,
    wherein said first endless belt means comprise;
    at least one motorized roller,
    at least one oscillatable blade spaced from said motorized roller,
    at least one endless belt entrained around said at least one motorized roller and said oscillatable blade, and
    actuation means for moving said oscillatable blade,
    wherein said actuation means comprise;
    motor means,
    lever means connected to said motor means,
    at least one rod-like member connected to said lever means and to said oscillatable blade, and
    connecting rod means associated with said rod-like member and being pivotally connected to said cylinder at said cylinder axis.

2. Rolling machine according to claim 1 wherein said lever means comprise an articulated quadrilateral lever system.

3. Rolling machine according to claim 1, wherein said connecting rod means comprise at least two connecting rods and
    wherein said rod-like member comprises at least one rod rigidly connected to said oscillatable blade and being connected to said connecting rods.

4. Rolling machine according to claim 3, wherein said at least two connecting rods are pivotally associated with said cylinder axis, and wherein said cylinder is located between said connecting rods.

5. Rolling machine according to claim 1, further comprising at least one shaft and a plurality of lever systems, said plurality of lever systems being interposed between said shaft and said connecting rod means.

6. Rolling machine according to claim 5, further comprising at least one adjustment handle associated with said shaft, wherein rotation of said adjustment handle is transmitted via said shaft, said lever systems and said connecting rod means whereby to cause rotation of said rod-like member about said cylinder axis.

7. Rolling machine according to claim 5, wherein said rod-like member is associated with one portion of said connecting rod means, and wherein said lever systems are associated with another portion of said connecting rod means, said one portion of said connecting rod means being located substantially diametrically opposite said other portion thereof with respect to said cylinder axis.

8. Rolling machine according to claim 1, wherein said transport means comprise at least one first conveyor belt and at least one second conveyor belt, said first conveyor belt and said second conveyor belt being aligned in said transport plane, said machine further comprising a plurality of calibration rollers, said calibration rollers lying in a calibration plane and being interposed between said first conveyor belt and said second conveyor belt.

9. Rolling machine according to claim 8, wherein said calibration plane lies substantially perpendicular to said transport plane.

10. Rolling machine according to claim 8, further comprising at least one dosage device, said dosage device being interposed between said calibration rollers and said cylinder and overlying said second conveyor belt.

11. Rolling machine according to claim 1, wherein said first endless belt means further comprise weight-controlled idler means, said weight-controlled idler means acting on said endless belt and being interposed between said at least one motorized roller and said oscillatable blade.

12. Rolling machine according to claim 1, wherein said lever means of said actuating means comprise;
    at least one oscillatable lever connected to said rod-like member,
    at least at least one arm connected to said oscillatable lever, and
    at least one cam interposed between said motor means and said oscillatable lever.

13. Rolling machine according to claim 12 further comprising at least one traction spring, said traction spring acting on said arm, whereby to maintain contact between said cam and said arm.

14. Rolling machine according to claim 11, wherein said transport means comprise at least one first spacer belt, at least one second spacer belt, and at least one third spacer belt, said second spacer belt being driven faster than said first spacer belt, said third spacer belt being driven faster than said second spacer belt.

15. A rolling machine particularly for producing croissants comprising;

transport means for moving dough material and defining a transport plane, first endless belt means defining an unloading plane, at least one cylinder interposed between said transport means and said endless belt means and having a cylinder axis, second endless belt means overlying said first endless belt means and partially overlying said cylinder, at least one seat defined by said first endless belt means, said second endless belt means and said cylinder, said transport means being adapted for moving dough material onto said cylinder, said seat being adapted for rolling dough delivered to said cylinder, wherein said first endless belt means comprise;

at least one motorized roller, at least one oscillatable blade spaced from said motorized roller, at least one endless belt entrained around said at least one motorized roller and said oscillatable blade, and actuation means for moving said oscillatable blade, wherein said actuation means comprise;

motor means, lever means connected to said motor means, at least one rod-like member connected to said lever means and to said oscillatable blade, and connecting rod means associated with said rod-like member and being pivotally connected to said cylinder at said cylinder axis, and wherein said first endless belt means further comprise weight-controlled idler means, said weight-controlled idler means acting on said endless belt and being interposed between said at least one motorized roller and said at least one blade.

16. Rolling machine according to claim 15, further comprising at least one shaft and a plurality of lever systems, said plurality of lever systems being interposed between said shaft and said connecting rod means, wherein said rod-like member is associated with one portion of said connecting rod means, and wherein said lever systems are associated with another portion of said connecting rod means, said one portion of said connecting rod means being located substantially diametrically opposite said other portion thereof with respect to said cylinder axis.

17. Rolling machine according to claim 15, wherein said transport means comprise at least one first conveyor belt and at least one second conveyor belt, said first conveyor belt and said second conveyor belt being aligned in said transport plane, said machine further comprising a plurality of calibration rollers, said calibration rollers lying in a calibration plane and being interposed between said first conveyor belt and said second conveyor belt, and wherein said calibration plane lies substantially perpendicular to said transport plane, said rolling machine further comprising at least one dosage device, said dosage device being interposed between said calibration rollers and said cylinder and overlying said second conveyor belt.

18. Rolling machine according to claim 15, wherein said lever means comprise an articulated quadrilateral lever system, wherein said connecting rod means comprise at least two connecting rods, and wherein said rod-like member comprises at least one rod rigidly connected to said oscillatable blade and being connected to said connecting rods, said at least two connecting rods being pivotally associated with said cylinder axis, said cylinder being located between said connecting rods.

19. Rolling machine according to claim 15, wherein said transport means comprise at least one first spacer belt, at least one second spacer belt, and at least one third spacer belt, said second spacer belt being driven faster than said first spacer belt, said third spacer belt being driven faster than said second spacer belt.

20. Rolling machine according to claim 15, wherein said lever means of said actuating means comprise;

at least one oscillatable lever connected to said rod-like member, at least at least one arm connected to said oscillatable lever, and at least one cam interposed between said motor means and said oscillatable lever, said rolling machine further comprising at least one traction spring, said traction spring acting on said arm, whereby to maintain contact between said cam and said arm. two connecting rods, and wherein said rod-like member comprises at least one rod rigidly connected to said oscillatable blade and being connected to said connecting rods, said at least two connecting rods being pivotally associated with said cylinder axis, said cylinder being located between said connecting rods.

21. A rolling machine particularly for producing croissants comprising:

transport means for moving dough material and defining a transport plane, first endless belt means defining an unloading plane, at least one cylinder interposed between said transport means and said endless belt means and having a cylinder axis, second endless belt means overlying said first endless belt means and partially overlying said cylinder, at least one seat defined by said first endless belt means, said second endless belt means and said cylinder, said transport means being adapted for moving dough material onto said cylinder, said seat being adapted for rolling dough delivered to said cylinder, wherein said first endless belt means comprise;

at least one motorized roller, at least one oscillatable blade spaced from said motorized roller, at least one endless belt entrained around said at least one motorized roller and said oscillatable blade, and actuation means for moving said oscillatable blade, wherein said actuation means comprise;

motor means, lever means connected to said motor means, at least one rod-like member connected to said lever means and to said blade, and connecting rod means associated with said rod-like member and being pivotally connected to said cylinder at said cylinder axis, said lever means comprising an articulated quadrilateral lever system, said connecting rod means comprising at least two connecting rods, said rod-like member comprising at least one rod rigidly connected to said oscillatable blade and being connected to said connecting rods, said at least two connecting rods being pivotally associated with said cylinder axis, said cylinder being located between said connecting rods, said rolling machine further comprising at least one shaft and a plurality of lever systems, said plurality of lever systems being interposed between said shaft and said connecting rod means, said rod-like member being associated with one portion of said connection rod means, said lever systems being associated with another portion of said connecting rod means, said one portion of said connecting rod means being located substantially diametrically opposite said other portion thereof with respect to said cylinder axis.

22. A rolling machine particularly for producing croissants comprising;
  transport means for moving dough material and defining a transport plane,
  first endless belt means defining an unloading plane,
  at least one cylinder interposed between said transport means and said endless belt means and having a cylinder axis,
  second endless belt means overlying said first endless belt means and partially overlying said cylinder,
  at least one seat defined by said first endless belt means, said second endless belt means and said cylinder, said transport means being adapted for moving dough material onto said cylinder, said being adapted for rolling dough delivered to said cylinder,
  wherein said first endless belt means comprise;
    at least one motorized roller,
    at least one oscillatable blade spaced from said motorized roller,
    at least one endless belt entrained around said at least one motorized roller and said oscillatable blade, and
    actuation means for moving said oscillatable blade,
  wherein said actuation mans comprise;
    motor means,
    lever means connected to said motor means,
    at least one rod-like member connected to said lever means and to said oscillatable blade, and
    connecting rod means associated with said rod-like member and being pivotally connected to said cylinder at said cylinder axis,
  wherein said lever means of said actuating means comprise;
    at least one oscillatable lever connected to said rod-like member,
    at least at at least one arm connected to said oscillatable lever, and
    at least one cam interposed between said motor means and said oscillatable lever,
  said rolling machine further comprising at least one traction spring, said traction spring acting on said arm, whereby to maintain contact between said cam and said arm.

* * * * *